Oct. 29, 1940. J. L. CONLON 2,219,382
WEATHER STRIP
Filed Dec. 31, 1937 2 Sheets-Sheet 1

INVENTOR.
James L. Conlon
BY
Barnes, Kisselle, Laughlin & Raisch
ATTORNEYS

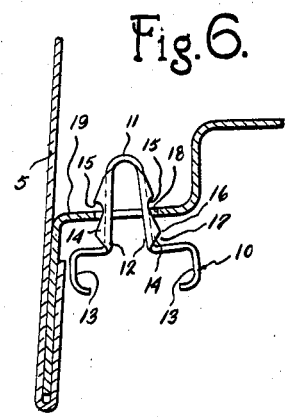
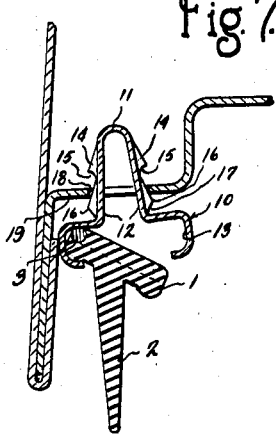
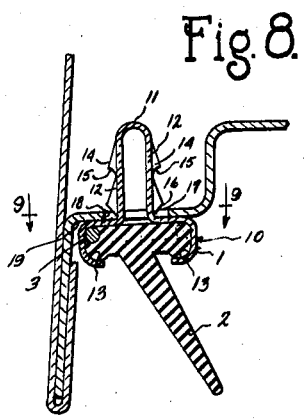
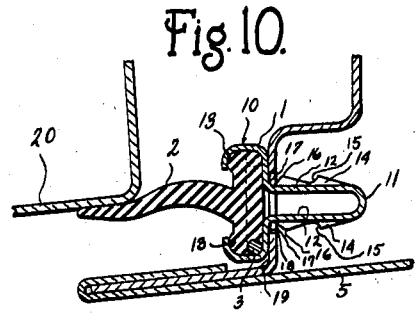
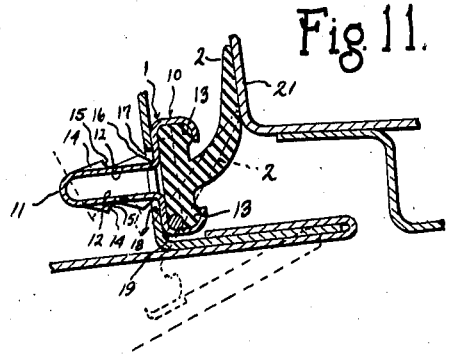
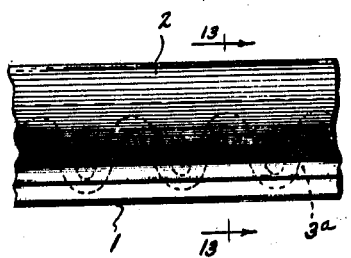
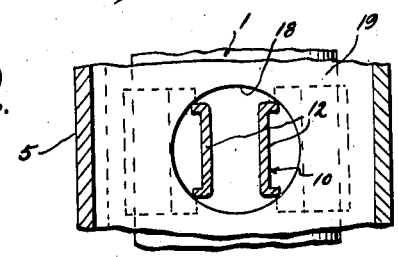
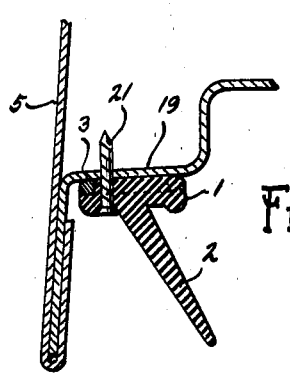
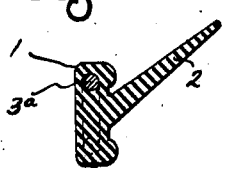

Patented Oct. 29, 1940

2,219,382

UNITED STATES PATENT OFFICE 2,219,382

WEATHER STRIP

James L. Conlon, Detroit, Mich., assignor to General Motors Corporation, Detroit, Mich., a corporation of Delaware Application December 31, 1937, Serial No. 182,709

2 Claims. (Cl. 20—69)

This invention relates to weather strips, and has to do particularly with weather strips for use on doors or the like of automobile bodies.

The objects of the invention are to provide an improved weather-strip construction which facilitates the mounting of the strip, particularly in that it has certain self-sustaining characteristics and need be attached to its support only at spaced points along its length; to provide a weather strip which, while having self-sustaining properties, is capable of being fashioned to conform to curved or off-set portions or the like in the support to which the strip is to be attached.
These and other objects will become more apparent as the detailed description is considered in connection with the accompanying drawings:

Fig. 6 is a cross sectional view taken substantially on line 6—6 of Fig. 2, illustrating a step in the attaching of the weather strip.

Fig. 7 is a cross sectional view taken substantially on line 7—7 of Fig. 2, showing another step in the attaching of the weather strip.
Fig. 8 is a cross sectional view taken substantially on line 8—8 of Fig. 2 showing the weather strip attached.

Fig. 9 is a cross sectional view taken substantially on line 9—9 of Fig. 8.
Fig. 10 is an enlarged cross sectional view taken on line 10—10 of Fig. 1 showing the function of the weather strip at the free edge or the lock pillar of a door.

Fig. 11 is a cross sectional view taken substantially on line 11—11 of Fig. 1 illustrating the function of the weather strip at the hinged pillar of the door.

Fig. 12 is a view of a modified form of the weather strip.
Fig. 13 is a cross sectional view taken substantially on line 13—13 of Fig. 12.

Fig. 14 is a view illustrating another way of attaching the strip.

The weather strip may advantageously be c
rubber having a base portion 1 and a flange 2 extending from the base portion. This flange is the sealing element and may be obliquely disposed relative to the base portion. The particular angle may vary depending upon the nature of the construction of the door and posts or the like which are to be sealed. The flange 2 may advantageously be of tapering form in cross section with its greatest width adjacent the body 1.

Figure 4:
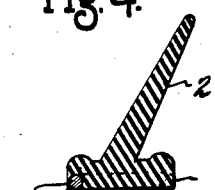
Fig. 4 is a cross sectional view taken substantially on line 4—4 of Fig. 3.

A metal strip or wire of undulated form is incorporated in the base. This wire is illustrated at 3 and may be molded into the base. As shown in Fig. 4 the bight portions of the undulated wire extend substantially to opposite edges of the base. In the modified form shown in Fig. 13 the undulations are of decreased depth and the wire placed somewhat above the lower edge of the base, so that the wire 3a is entirely encompassed in the rubber of the base.

Figure 1:
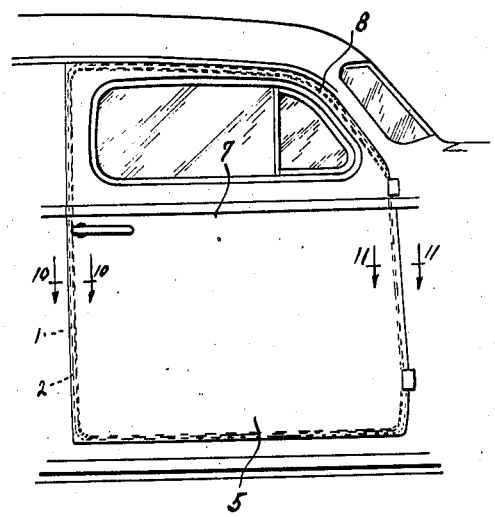
Fig. 1 is a view illustrating a portion of an automobile body and a door with which the weather strip may be used.
Figure 2:
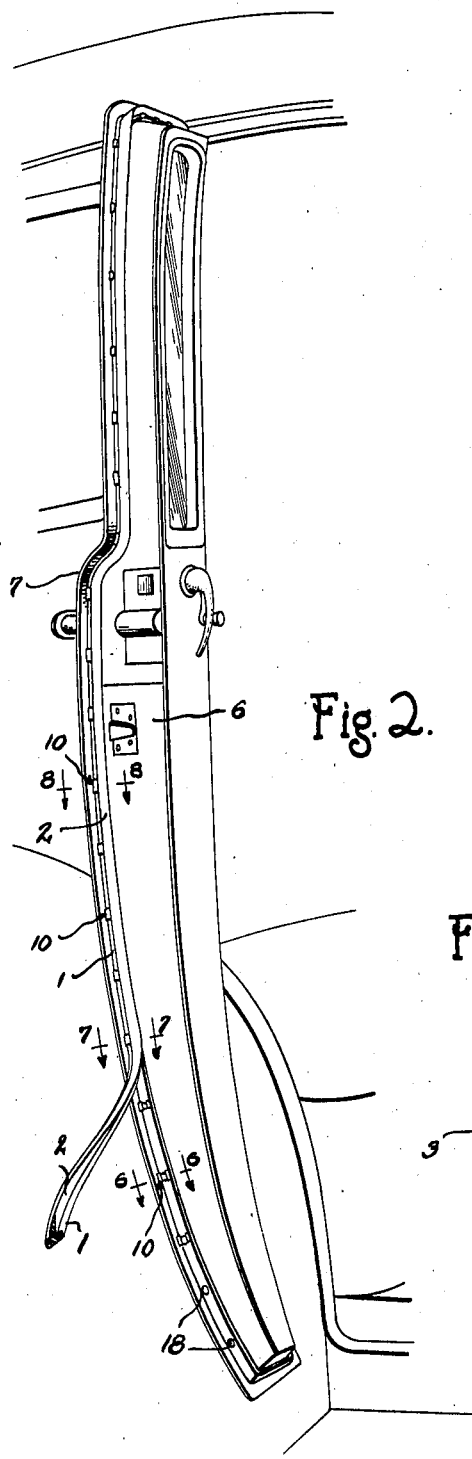
Fig. 2 is a view showing a door in open position.
Figure 3:
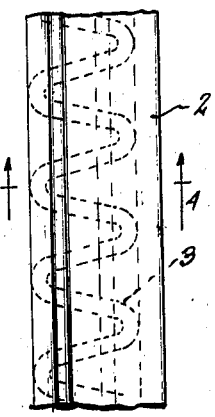
Fig. 3 is a plan view of the weather strip with some parts in dotted lines.

As examples of the use of the strip, a portion of a vehicle is illustrated in Fig. 1 having a door 5 which is at the front of the vehicle. In Fig. 2 a rear door is shown at 6 and it is illustrated in open position with the weather strip partially mounted thereon. At about the belt line the door shown has an outwardly curved formation 7 and as the strip is mounted it may be fashioned and fitted to the curved formation. The particular curve shown requires the strip to be bent or fashioned in the same general direction as the extent of the flange 2. However, the strip may be fashioned into curves or shapes in a direction transverse to the general extent of the flange 2, as for example, where the strip is fashioned along the curved part of the header of the door as illustrated substantially at the point 8 in Fig. 1. Where corners are not too sharp the strip may be fashioned around the same.

Figure 5:
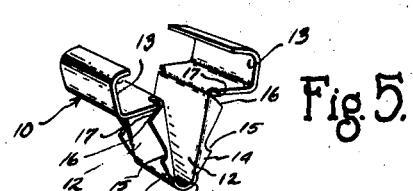
Fig. 5 is a perspective view of an attaching clip which may be used.

The base of the strip with the undulated wire reenforcement, while being capable of conforming to these different shapes, nevertheless resists any tendency to twist the same. This strip may be secured in position at spaced points along its length, thus eliminating the necessity of using cement or a continuous channel. Spaced clips 10 may be employed for this purpose. Such a clip is illustrated in Fig. 5, the same being fashioned from sheet metal, with a bight portion 11, and legs 12 extending therefrom. The upper ends of the legs are fashioned into channel portions 13. The metal of the legs 12 is preferably fashioned to provide flanges 14, each with a notch 15 and with an upper end 16 spaced from the metal forming the channel to provide, in effect, notches 17.

The clips may be secured to the jamb face of a door by first passing the bight portion through an aperture 18 in the jamb face 19 until the aperture is located at the notches 15. The clip is not collapsed to any substantial extent at this time. With the clip in this position (Fig. 6) the weather strip may be located in the channel as demonstrated in Fig. 7. Then the clip may be pushed home in the aperture until the notches 17 reach the aperture, and the surfaces 16 engage the jamb face on one side, and the channel construction engages the jamb face on the other side. In this way the clips may be located in the apertures as shown in Fig. 2, and then the strip subsequently placed in the channel formations and then the clip pushed down into final position.

The flange 2 is designed to engage a post or the like of the car body, such a post being illustrated at 20 in Fig. 10. The strip may be thus arranged at the lock pillar of the door, that is the edge of the door opposite the hinged edge, and along the top of the door or header and along the bottom of the door. However, at the hinged pillar the strip is preferably arranged to seal after the manner illustrated in Fig. 11. In this view the post 21 of the car body is at the hinged edge of the door and the door is illustrated in open position by the dotted lines. As the door closes, the flange 2 engages the post 21 and it engages the post 21 on its side opposite the side of engagement illustrated in Fig. 10. The same strip may be used in both installations, although if necessary or advisable the angularity of the flange relative to the base may be varied.

As illustrated in Fig. 10, the flange engages a face to seal thereagainst, which extends generally parallel to the plane of the door. In this arrangement the flange engages the post 20 in such a manner that closing the door tends to straighten the flange up toward a position at a right angle to the base. In Fig. 11 the flange engages a surface which extends generally at right angles to the plane of the door, and the tendency here is to bend the flange in a direction which increases its obliquity.

The weather strip may be secured in position by other means than by this particular form of clip. For example, it may be mounted by the so-called drive screw for metal work. Such a drive screw is adapted to be driven through an aperture in a sheet metal support, and is arranged to grip the metal of the support and hold fast in the aperture. Said a screw is illustrated at 21 in Fig. 14.

I claim:

1. A flexible reinforced weather strip comprising a web or base flat on one side and arranged to bear against a surface such as the jamb face of an automobile door and an upstanding flange rising from the mid-portion of said base for contact with another surface such as the jamb of the body pillar, the said base having embedded therein a zigzag or wavy wire reinforcing strip to give the weather strip a semi-rigidity to permit the same to span the spaces between widely spaced fastening points without unduly bowing, said weather strip by reason of the zigzag reinforcement being readily bendable both edgewise of the flange and edgewise the flat base to accord with the contours on which it is seated.

2. A flexible reinforced weather strip comprising a web or base flat on one side and arranged to bear against a surface such as the jamb face of an automobile door and an upstanding flange rising from the mid-portion of said base for contact with another surface such as the jamb of the body pillar, the said base having embedded therein a zigzag or wavy wire reinforcing strip to give the weather strip a semi-rigidity to permit the same to span the spaces between widely spaced fastening points without unduly bowing, the face of the web or base from which the flange rises having upstanding beads adapted to be grasped by the ends of the arms of anchoring clips, said weather strip by reason of the zigzag reinforcement being readily bendable both edgewise of the flange and edgewise the flat base to accord with the contours on which it is seated.

JAMES L. CONLON.